(12) United States Patent
Vorsteher et al.

(10) Patent No.: US 6,966,429 B2
(45) Date of Patent: Nov. 22, 2005

(54) CONVEYOR PAN

(75) Inventors: Dirk Vorsteher, Bielefeld (DE); Gerhard Merten, Lunen (DE); Frank Fischer, Lunen (DE); Jorg Wirtz, Hattingen (DE); Siefgried Schmidt, Bottrop (DE); Martin Broszat, Nordkirchen (DE); Alfred Hefferan, Venetia, PA (US); John Cobley, Farnsfield (GB); Alister McAndrew, Belper Derby (GB); Olaf Losbrodt, Herne (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/439,074

(22) Filed: May 15, 2003

(65) Prior Publication Data

US 2003/0213678 A1    Nov. 20, 2003

(30) Foreign Application Priority Data

May 17, 2002    (DE) ............................... 102 22 597

(51) Int. Cl.⁷ ............................................ B65G 19/28
(52) U.S. Cl. ................................ 198/735.6; 198/735.2
(58) Field of Search ......................... 198/735.2–735.4

(56) References Cited

U.S. PATENT DOCUMENTS

| | | | | |
|---|---|---|---|---|
| 4,282,968 A | * | 8/1981 | Temme ..................... | 198/735.2 |
| 4,541,525 A | * | 9/1985 | Braun et al. ............. | 198/735.2 |
| 4,624,362 A |   | 11/1986 | Temme et al. | |
| 4,637,510 A | * | 1/1987 | Tomlinson ............... | 198/735.4 |
| 4,643,296 A | * | 2/1987 | Braun et al. ............. | 198/735.4 |
| 4,658,952 A | * | 4/1987 | Grundken et al. ....... | 198/735.4 |
| 4,667,811 A | * | 5/1987 | Schoop et al. ........... | 198/735.3 |
| 4,705,160 A | * | 11/1987 | Grundken et al. ....... | 198/735.4 |
| 4,735,304 A | * | 4/1988 | Schoop et al. ........... | 198/735.3 |
| 6,401,912 B1 | * | 6/2002 | Bandy, Jr. ................ | 198/735.4 |

FOREIGN PATENT DOCUMENTS

| | | |
|---|---|---|
| DE | 933 884 | 9/1955 |
| DE | 935302 | 11/1955 |
| DE | 974 612 | 2/1961 |

(Continued)

*Primary Examiner*—Gene O. Crawford
*Assistant Examiner*—Mark A. Deuble
(74) *Attorney, Agent, or Firm*—Cook, Alex, McFarron, Manzo, Cummings & Mehler, Ltd.

(57) ABSTRACT

The conveyor pan according to the present invention has a framework construction (1) having the bottom run (2) and an interchangeably constructed exchangeable tray (4) forming the top run (3), which can be lifted out, vertically supported on the framework (1). The framework construction (1) of the conveyor pan (50) has two roiled U-profiles forming the side walls of the conveyor pan, each of which has a vertically extending intermediate arm (11), an upper, outwards facing flange arm (12) and, lower outwards facing flange arm (13). The identically constructed but mirror imaged iron U-profiles (10), i.e. with the flange arms (12), (13) arranged facing away from each other, are joined firmly to each other by means of welded on plate strips (5A, 5B) at about half height on the inner wall (14) of the intermediate arm (11), whereby the plate strips (5A, 5B) leave an opening (6) inside the conveyor pan (50), which, with the exchangeable tray (4) removed, can serve as an inspection opening for the scraper chain, not shown, circulating in the bottom run (2) and equipped with scrapers. In the free space between the flange arms (12, 13) toggle pockets are welded in with a positive engagement, which additionally stiffen the iron U-profiles and the plate strips (5A, 5B) are supported by means of bottom run rails (20) on a continuous base plate (7) welded on beneath the iron U-profile (10).

19 Claims, 3 Drawing Sheets

FOREIGN PATENT DOCUMENTS

| | | |
|---|---|---|
| DE | 1258333 | 1/1968 |
| DE | 29 18 007 | 11/1980 |
| DE | 40 06 183 C2 | 7/1988 |
| DE | 39 05 324 A1 | 8/1990 |
| DE | 40 05 249 A1 | 9/1991 |
| EP | 0 525 926 B1 | 9/1995 |
| GB | 681954 | 10/1952 |
| GB | 2095195 A * | 9/1982 |

* cited by examiner

CONVEYOR PAN

The present invention relates to a conveyor pan for an underground face or gate conveyor with a top run and a bottom run for the guidance of the scraper of a scraper chain with a conveyor base separating these, with means for linking the conveyor pans and with two side walls each comprising a rolled iron U-profile having an intermediate arm and two flange arms and which are joined together by at least one welded on plate arranged at about half height and on the vertically extending intermediate arm of the iron U-profiles.

In underground extraction installations such as for example underground mining operations, chain scraper conveyors with large overall lengths come into use, which are put together from individual conveyor pans connected together in tension at their ends. The joining of the adjacent conveyor pans connected to each other occurs for instance via toggle pockets and toggles, which permit a certain angular mobility in the horizontal and the vertical axes of the adjacent conveyor pans, so that the chain scraper conveyor can compensate for unevenness in the ground and can be moved along with the advance of the working face. Insofar as the conveyor pans are applied in face conveyors they are provided on the spoil side and/or on the working face side with built on parts for the guidance for instance of an extraction plough or a shearer loader and have connecting brackets for an advancing beam abutting the face support. Owing to improvements in the performance of extraction of the extraction machines and the increase of the face lengths in the meantime of up to 450 m the conveyor performance to be provided by the conveyors is rising similarly and modern face and gate conveyors must be able to cater for conveyor capacities of at least 2000 t/h (tonnes-hour), in the case of high performance conveyors even 5000 t/h can be coped with. With increasing conveyor capacity the wear on individual conveyor pans necessarily increases and there is a need on the market for conveyor pans with higher conveyor capacity and longer lifetime at the low production costs and the low overall weight for the individual conveyor pans.

Modern underground face and gate conveyors can be divided into three groups according to the construction of the conveyor pans. The first group includes conveyors with completely cast conveyor pans. The advantage of such a cast construction lies in its high reproducibility, its high loading capacity, owing to its homogeneous construction, and low liability to assembly failures. Disadvantageous are the high material costs, arid the low adaptability for designing to cater for higher loadings or longer lifetimes and the lack of a possibility of exchanging worn parts.

The second group is formed of so-called hybrid pans, which on the one hand comprise cast parts and on the other rolled parts. A hybrid pan of this construction is for instance proposed in EP-B-0,525,926. Hybrid parts can be made with few welded seams, since for instance the entire construction of the side walls including the side profiles for the guidance of the scraper in the trays and the toggle pockets can be formed in a single part as a part of the means for connecting the conveyor pans, whilst the conveyor base as one of the most loaded parts is welded onto the cast side walls. Furthermore, in hybrid pans it is known for the conveyor pan joining means and other built on parts for moving the conveyor or for the guidance of an extraction machine to be welded on retrospectively proposed for instance in DE-A-39 05 324.

The third group of conveyor pans comprises entirely or almost entirely those of a welded construction whereby at least the higher loaded components such as the conveyor base and/or the side profiles comprise rolled profiles and hereby have a significantly longer lifetime and lower liability to wear, e.g. DE-A-29 18 007, DE-C-39 33 884 or DE-C-40 06 183. The essential advantage of the welded conveyor pan lies in the fact that, owing to the choice of different materials and production methods for the individual parts of the welded construction, the lifetime of the conveyor pan can be increased overall. Its essential disadvantage lies in high personnel dependent production costs and long production times owing to the multiplicity of assembly stages and welded joints to be undertaken.

A generic conveyor pan of welded construction based on the preamble to claim 1 is proposed in DE-A-974 612. The simple construction of this conveyor pan is characterised by rolled iron U-profiles which form the side walls of the conveyor pan with their flange arms facing each other and which are welded together via a plate forming the conveyor base, whose edge sections are angled obliquely upwards. The flange arms can hereby at the same time form the upper and lower guide rails for the scraper ends of the scrapers and almost any desired built on parts for the guidance of extraction machines and similar can be attached to the outer sides of the vertically extending intermediate arms.

It is an aim of the present invention to produce a conveyor pan which offers the advantages of welded construction, which has a comparatively simple construction, can be produced cost effectively and which is suitable for application even in modern high performance conveyors.

Accordingly the present invention is directed to a conveyor pan as described in the opening paragraph of the present specification, in which the iron U-profiles are joined with their horizontal flange arms pointing facing outwards i.e. facing away from each other, that the top run has two separate rolled side profiles preferably L-shaped or essentially T-shaped, which are welded by their vertical arms to the conveyor base, and that the plate joining the iron U-profiles is supported by means of rails forming the side guides for the bottom run against a base plate welded to the lower flange arms.

Since the connecting plate is supported from below, the forces and loads front the top run act essentially parallel to the vertically extending intermediate arm of the iron U-profile and are introduced via the bottom run rails into the base plate and can be supported by this. Apart from this, owing to the combination of the previously named features, the possibility is produced for the preferred configuration of the conveyor pan according to the present invention, of constructing the top run as an exchangeable tray which comprises exclusively the side profiles and the conveyor base, whilst the plate which joins the iron U-profiles together is a separate component and is not formed from the conveyor base. Although this leads to a small increase in the weight of the overall conveyor pan, this can however be partly compensated for by the thinner walls in the configuration of the iron U-profiles.

Preferably the plate joining the iron U-profiles is an intermediate plate and the top run is an exchangeable tray comprising two side profiles and a conveyor base provided with wear reinforcement, which are welded to a strong conveyor base formed from rolled sheet. The distance between the intermediate arms of the iron U-profiles is then determined in accordance with the dimensions of the exchangeable tray. Advantageously the side profiles arc supported by means of an outward facing arm extension of the horizontal arm on the upper flange arm in each case of the iron U-profiles. If the side profiles of the exchangeable tray support themselves on the upper flange arms of the iron U-profiles, it is achieved that the forces are introduced at least partly in parallel into the side cheeks formed by the iron U-profile and consequently also favourably into the intermediate arm and can be accepted by this. In a preferred embodiment as the retaining means for the exchangeable tray the outer end surface of the horizontal arm extension of each arm of the side profile or the outer walls of the vertical arm of the L-shaped side profiles without arm extensions are in each case welded preferably by means of a single continuous long welded seam to tho upper sides of the upper flange arm of the iron U-profiles, whereby for dismounting of the exchangeable tray the welded seam is separated, preferably by machine, especially milled out. Because of the welding of the exchangeable tray to the flange arms, separate retaining means for the exchangeable tray are dispensed with, so that the weak position otherwise present in exchangeable trays can be avoided in this construction. Preferably the plate joining the iron U-profiles comprises two plate strips arranged separated from each other leaving an opening free between them so that on the one hand the overall weight of the conveyor belt can be further reduced and on the other hand using the opening between the metal strips, an inspection opening is obtained via which the scraper chain in the bottom run is accessible.

In a preferred embodiment one of the metal strips extends out over one of the conveyor pan ends over both the ends of the iron U-profiles and the other metal strip is arranged set back from the other conveyor pan end. In the assembled exchangeable tray the metal strips then engage beneath the abutment position at the edges of the conveyor base, so that no fine material can escape into the bottom run.

A first alternative preferred embodiment of a conveyor pan according to the present invention comprises a single part base plate forming the bottom run base welded on below the lower flange arms of the iron U-profiles and with edge rails extending out on both sides beyond these, onto which two bottom run rails essentially with two arms, right angled on the outside and provided on the inside with a curved profile contour matched to the scraper ends are welded on by their lower arms. The forces which are introduced from the top run via the conveyor base into the intermediate plate(s) can be accepted by the strong lower leg arid the possibly weaker walled upper leg of the bottom run rails and the welded joints with which the intermediate plate or the plate strips are welded to the intermediate arms of the iron U-profile, are relieved from pressure. Advantageously the wail thickness of the lower arm of the bottom run rails can for, this be at least 30% preferably some 50% thicker than the wall strength of the upper arm of the bottom run rails. To reduce the number of assembly stages the top surface of each upper arm and the surrounding edge of each metal strip of the intermediate plate are welded via a single common welded joint to the intermediate arm of the iron U-profile.

A second alternative preferred embodiment of a conveyor pan according to the present invention comprises a bottom run base formed in one part with the bottom run rails, in which bent and vertically extending edge sections form the bottom run rails, whereby the base plate preferably comprises two plate sections extending continuously over the length of the conveyor pan, which are in each case welded to one of the lower flange arms of the iron U-profile. This measure also further reduces the overall weight of the conveyor pan. To stiffen and additionally, support the bottom run base, supporting ribs can be welded in between the edge sections of the bottom run base and the plate sections. The outer edge rails of the plate sections or of the single part base plate, which extend out past the lower flange arms of the Iron U-profile, can preferably angled downwards. The iron U-profile can preferably comprise thin walled formed steel with weight optimising wall thickness and/or from a standard profile.

The configuration of the conveyor pan with flange arms turned outwards is advantageous if the means for connecting the conveyor pans preferably comprise forged toggle pockets, which are inserted between the mutually facing inner sides of the flange arms and welded in so as on the one hand further to strengthen the iron U-profile and hereby to permit a further reduction of its wall thickness and on the other hand to be able to apply them to the side walls at least accurately matched in height and thereby simplified in the production engineering. The welding on of the toggle pockets to the iron U-profiles is effected preferably such that the toggle pockets on one end of the conveyor pan extend out over the iron U-profile and on the other end of the conveyor pan are arranged to be set back, so that due to the overlapping of the toggle pockets at the abutment of the conveyor pans fatigue wear or break-outs on the ends of the iron U-profiles and/or of the conveyor base between two adjacent conveyor pans can be avoided. The outwards turned flange arms of the iron U-profiles offer further to this the advantage that the end at least of a connecting bracket for an advancing beam can be inserted and welded in between the mutually facing inner sides of the flange arms of the iron U-profile. Further the construction of the conveyor pan according to the invention offers the possibility, in the use of the conveyor pan for a face conveyor, for an angled guide plate to he welded on between the edge rails of the plate section or of the base plate forming the bottom run base and the upper flange arm of the iron U-profile, as a static loading ramp, with which the spoil can be conveyed when moving the conveyor in the top run.

In an extension of the conveyor pan according to the present invention is provided with an exchangeable tray with an inspection opening between the palate strips forming the intermediate plate. It is preferred if the exchangeable tray of some conveyor pairs is formed as an inspection tray and preferably comprises three identical tray sections each with a conveyor base section and two essentially L-shaped or T-shaped side profile sections, whereby the two outer tray sections are welded to the outside edge of the horizontal arms of the side profile sections or to the outer walls of the side profiles with the upper side of the top arm using in each case a single continuous long welded seam and the center tray section is retained by means of detachable retaining means to the two other tray sections and/or to the upper flange arm of the iron U-profile. The conveyor base sections of all the tray sections are then preferably provided by flame cutting with curved edges, whereby the curved profile of one edge is complementary to the curved profile of the other edge in order to facilitate a smooth scraper transfer between the tray sections. It is understood that preferably then also the conveyor base on the conveyor pan side is provided with curved shaped edges produced by flame cutting and the curved profile of each of the edges is complementary to the curved profile of the other edge of the conveyor base.

Examples of conveyor pans made in accordance with the present invention will now be described hereinbelow in reference to the accompanying drawings, in which FIG. 1 shows a perspective view of a conveyor pan according to the present invention;

Figure 1:
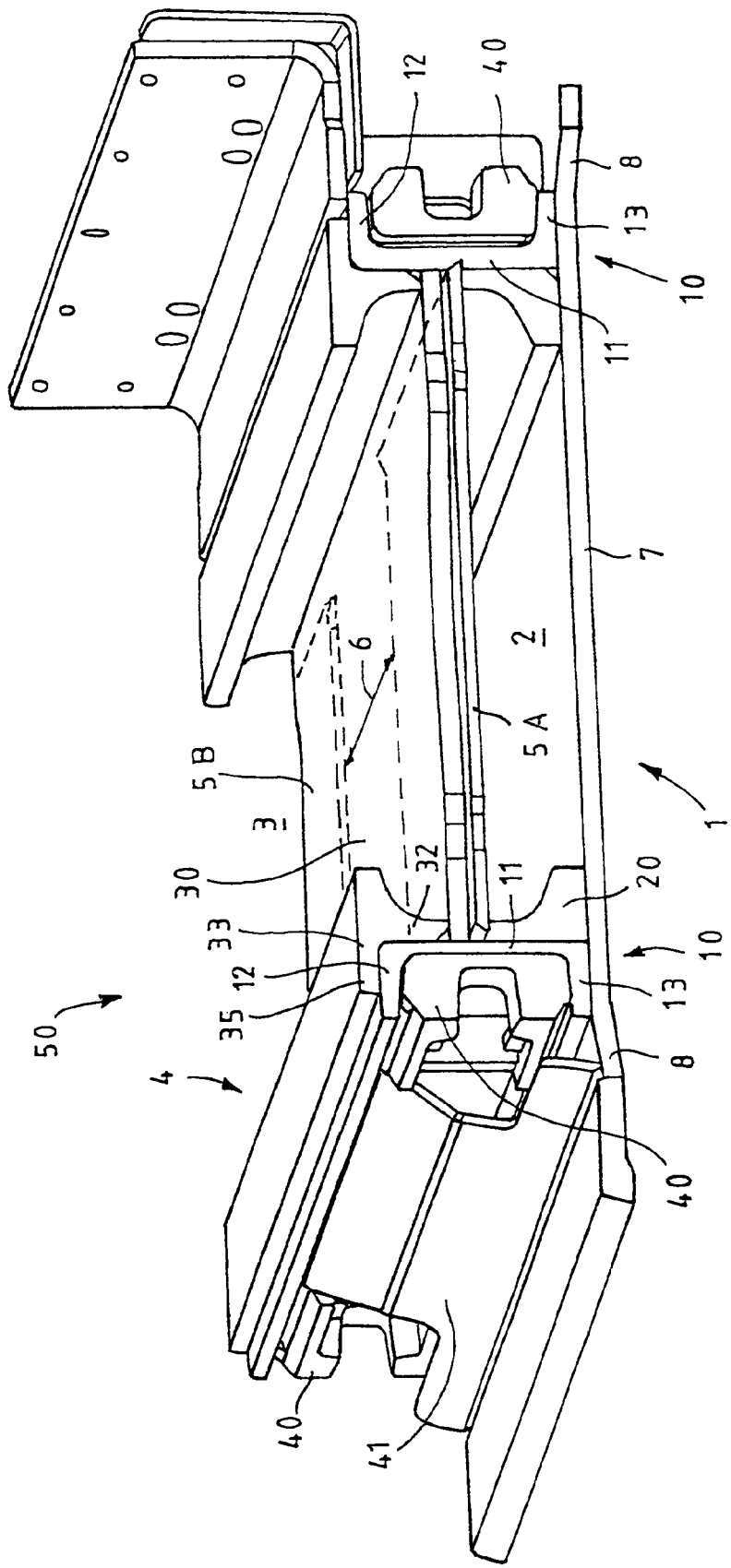
Figure 2:
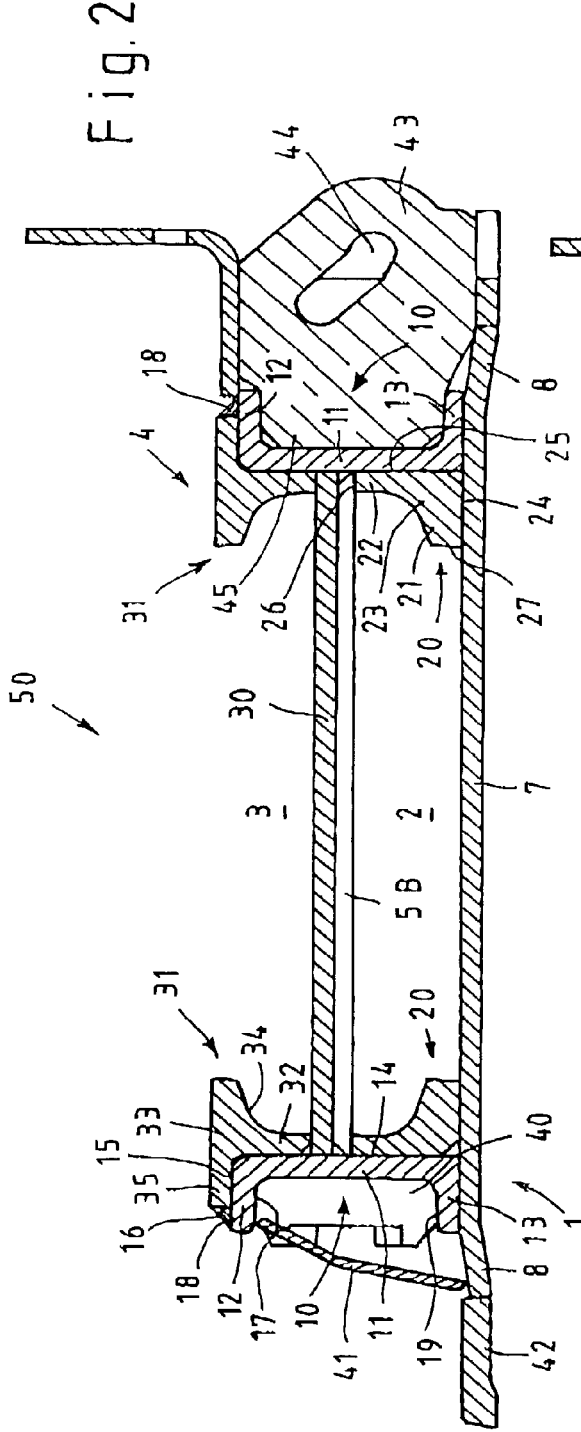
FIG. 2 shows a vertical section through the conveyor pan shown in FIG. 1.

The conveyor pan 50 is shown in FIG. 1 and FIG. 2 in the configuration for a face conveyor and comprises a frame construction 1 including the bottom run 2 and an exchangeable tray 4 forming top run 3 constructed exchangeably and supported on the frame construction 1. The exchangeable tray 4 shown in the assembled condition can be lifted out vertically from the frame construction 3. The frame construction 1 of the conveyor pan 50 has as its essential component two rolled iron U-profiles formed the side walls of the conveyor pan 50, each of which has a vertically extending intermediate arm 11, an upper flange arm 12 facing outwards and a lower outward facing flange arm 13. The iron U-profiles 10, formed identically to each other but as mirror images, i.e. with the flange arms 12, 13 facing away from each other are firmly joined to each other by means of two metal strips 5A, 5B welded on at about half height to the inner wall 14 of the intermediate arm 11 and schematically shown in FIG. 1, whereby the metal strips 5A, 5B are separated from each other and form an opening 6 within the conveyor pan 50 which when the exchangeable tray 4 is removed can serve as an inspection opening for the scraper chain, not shown, circulating in the bottom run 2 and carrying the scrapers. The frame construction 1 in the conveyor pan 50 comprises further a base plate 7 extending over the entire breadth of the conveyor pan, which is supported on the ground in the underground face on the edge rails 8, slightly angled downwards and extending over the lower flange rails 13 of iron U-profiles 10. The metal strips 5A, 5B are supported against the base plate 7 by means of two preferably rolled two armed bottom run rails 20, which comprise a lower arm 21 and an upper arm 22, on whose inner surface 23 a profile form matched to the scraper ends is provided and whose outer sides 24, 25 are angled at right angles to each other. The upper arm 22 runs parallel to the intermediate arm 11 and its top side 26 supports the intermediate plates 5A, 5B, by their edge regions in a vertical direction, consequently parallel to the intermediate arm 11. The tapper arm 22 and the edge region of the metal strips 5A, 5B can be welded by means of a single welded joint, not shown, to the inner sides 14 of the intermediate arm 11. Further welded joints, not shown, for the stiffening of the frame construction 1 are provided between the lower flange arms 13 and the edge rails 8 of the base plates 7 and the inner edges 27 of the base arm 21 and the base plate 7, whereby all the welded joints extend continuously over the length of the conveyor pan and owing to the design and the construction of the conveyor pan 50 can be applied by means of welding robots.

The exchangeable tray 4 comprising the top run 3 comprises exclusively a conveyor base 30 and two side profiles 31 constructed as rolled profiles, which in the embodiment shown have an approximately T-shaped cross-section with a vertical womb 32 and a horizontal web 33. The foot of the vertical web 32 is welded to the conveyor base 30 using a long welded seam. The inner surface 34 of the vertical web 32 and of the horizontal web 33 runs towards the top run 3 with a profile contour which is matched to the profile contour of the scraper ends, not shown, so that these are guided at the sides in the top run 3. The side profiles 31 are dimensioned with sufficient wall thickness to form a wearing or consumable layer of several mm, e.g. 15 mm, on the inner surface 34 of the side profiles. Horizontal web 33 of both side profiles 31 has an arm extension extending out beyond the vertical web 32, with which the exchangeable tray 4 its supported on the upper side 15 of the upper flange arm 12. The outside end surface 16 of the arm extension 35 of the horizontal section 33 of both side profiles 31 is welded using a long welded seam 18 to the cover side 15 of the upper flange 12, whereby for the exchange of the exchangeable tray 4 both long seams 18 are separated or milled out by machine; a new exchangeable tray 4 can then be joined together with the upper flange arm 12 of the iron U-profile 10 using a new welded seam.

Since the flange arms 12, 13 of the iron U-profiles 10 are turned outwards, an accepting space is formed bordered by the intermediate arm 11 and the inner sides 17, 19 facing each other of the two flange arms 12, 13, in which forged toggle pockets 40 as a part of the conveyor pan joining means can be inserted with a positive engagement arid welded in. The toggle pockets 40 completely filling out the accepting space at least on the abutment ends of the conveyor pans 50 provide also an additional stiffening between the two flange arms 12, 13 of the iron U-profiles 10 and consequently of the iron U-profiles 10 themselves, so they their wall thickness and that of the intermediate arm 11 can be maintained comparatively low and can be designed to optimise weight. As can be seen in FIG. 1 the two toggle pockets 40 providing pocket acceptances for the heads of toggle bolts, not shown, extend at the ends over the iron U-profiles 10 whilst those on the rear end of the conveyor pan in FIG. 1 are arranged to be set back. Also the metal strip 5A extends out over the iron U-profiles 10 essentially by the same amount whilst the metal strip 5B is set back, so that the metal strips 5A, 5B overlap the conveyor base 30 essentially ending in a joint with the iron U-profiles 10 in a tongue formation, in order to prevent an ingress of fine coal dust from the conveyor run 3 into the return run 2.

The embodiment shown describes with a conveyor pan 50 for a face conveyor. The bit hand lateral side of the conveyor pan 50 in FIG. 1 and FIG. 2 is therefore provided with a guide plate 41 as a static loading ramp, which is welded in between the front edge of the edge rail 8 and the bottom side of the upper flange arm 12. In front of the guide plate 41 a machine track 42, e.g. for a shearer loader is welded on and on the opposite lateral side, which in underground face working forms the spoil side of the conveyor pan 50, a connecting bracket 43 with a connecting opening 44 for an advancing beam for the movement of a face conveyor formed from several conveyor pans 50 is welded on. The front area 45 of the connecting bracket 43 is matched to the free space in the iron U-profile 10 and lies forming a positive engagement between the inner sides 17, 19 of the two flange arms 12, 13.

Figure 3:
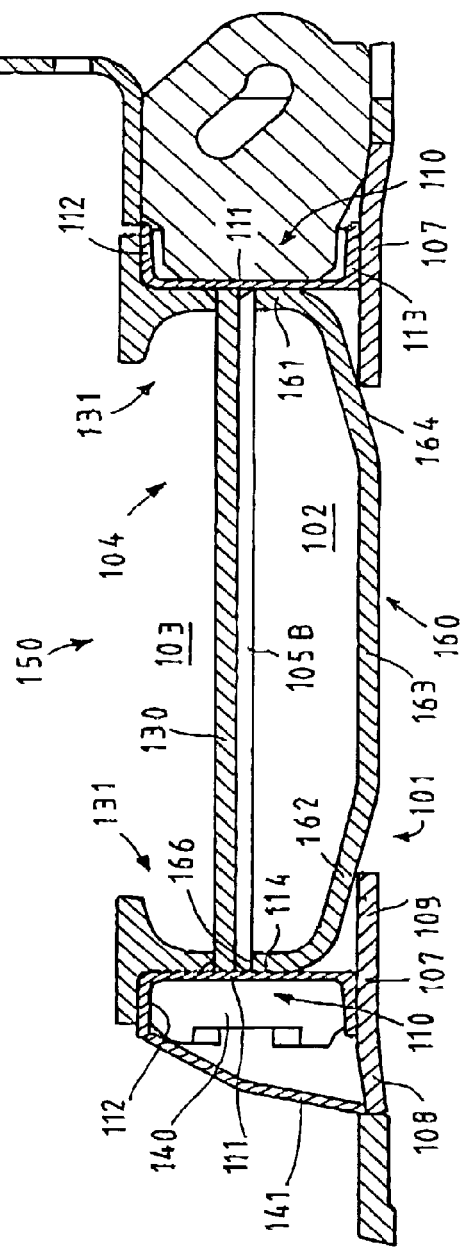
FIG. 3 shows a vertical section trough a conveyor pan according to a second embodiment.

FIG. 3 shows a second embodiment of a conveyor pan 150 which comprises similarly iron U-profiles 110 forming side walls with intermediated arms 111, lower flange arms 113 and upper flange arms 112, each of which is turned outwards and forms a free space for the positive engagement acceptance of the forged toggle pockets 140. The iron U-profiles 110 of the frame construction 101 accepting the bottom run 102 are here also joined together by means of two metal strips of which only the intermediate metal strip 105B can be seen in FIG. 3. The side edges of the metal strips 105B are welded at about half height to the inner wall 114 of the intermediate leg 111 and above the metal strip 105B the exchangeable tray 104 is supported it the top run 103, whose construction corresponds to the exchangeable tray according to FIGS. 1 and 2 and has the conveyor base 130 and side profiles 131.

In contrast to the conveyor pan 50 according to FIG. 1 and FIG. 2 no continuous base plate is present in the conveyor pan 150, but on both the lower flange arms 113 of the iron U-profile 110 plate sections 107 are welded on which are formed identical to each other, which extend over the lower flange arm 113 of the iron U-profile with an outer outward angled edge rail 108 and an equally inner plate extension 109. The bottom run base for the bottom ruin 102 comprises in the conveyor pan 150 a single part plate 160 with formed edge sections 161 extending vertically upwards, whereby between the central section 163 and the edge sections 161 of the plate 160 intermediate sections 162 arc formed whose profile and angling is matched to the profile form of the scraper. The intermediate sections 162 which run at an angle between the edge sections 161 and the central section 163 are welded there by their undersides 164 to the flat plate extension 109 of the plate strips 107. For additional vertical support between the plate extension 109 and the intermediate section 162 supporting ribs, not shown, can be welded in. The upper head ends 166 of the edge sections 161 can be welded with the plate strips 105 and the inner wall 114 of the intermediate arm 111 by means of a common welded joint.

The embodiment of the conveyor pan 150 makes it plain that the iron U-profile can also comprise thin walled standard profile, since all the forces are introduced in the vertical direction approximately parallel to the intermediate arm 111 into the iron U-profile 110 and the top run 103, in which the extracted ore such as coal is conveyed, is additionally supported by the intermediate base 105B welded at the sides onto the intermediate arm 111 and the angled plate 160 forming the base of the bottom run. The thin walled iron U-profile shown in FIG. 3 could especially also find application in the conveyor pan according to FIG. 1 and FIG. 2.

Figure 4:
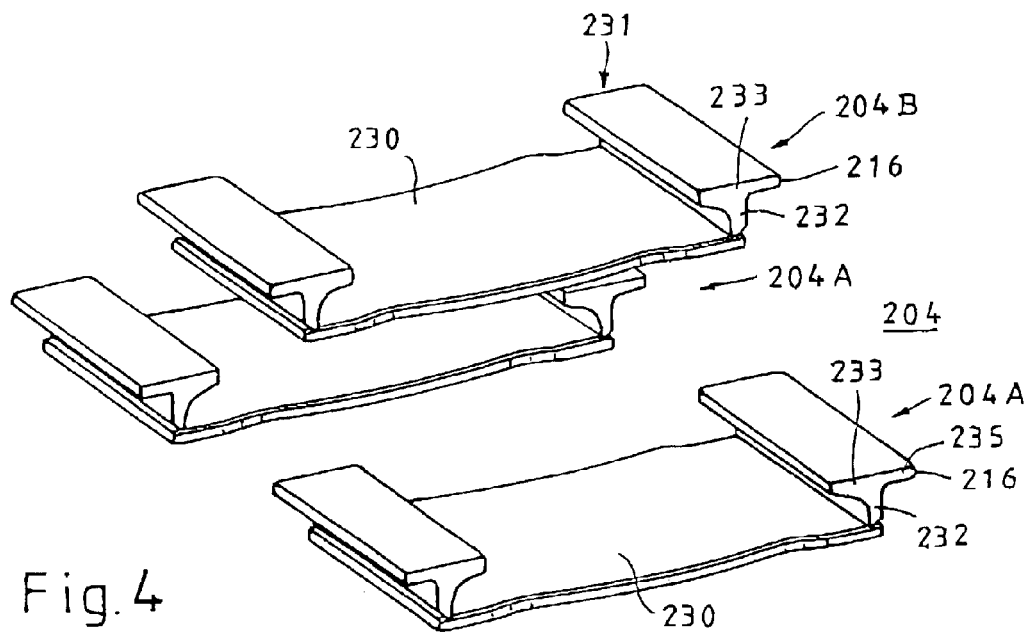
FIG. 4 shows a perspective view of an inspection tray formed from three identical tray sections.
Figure 5:
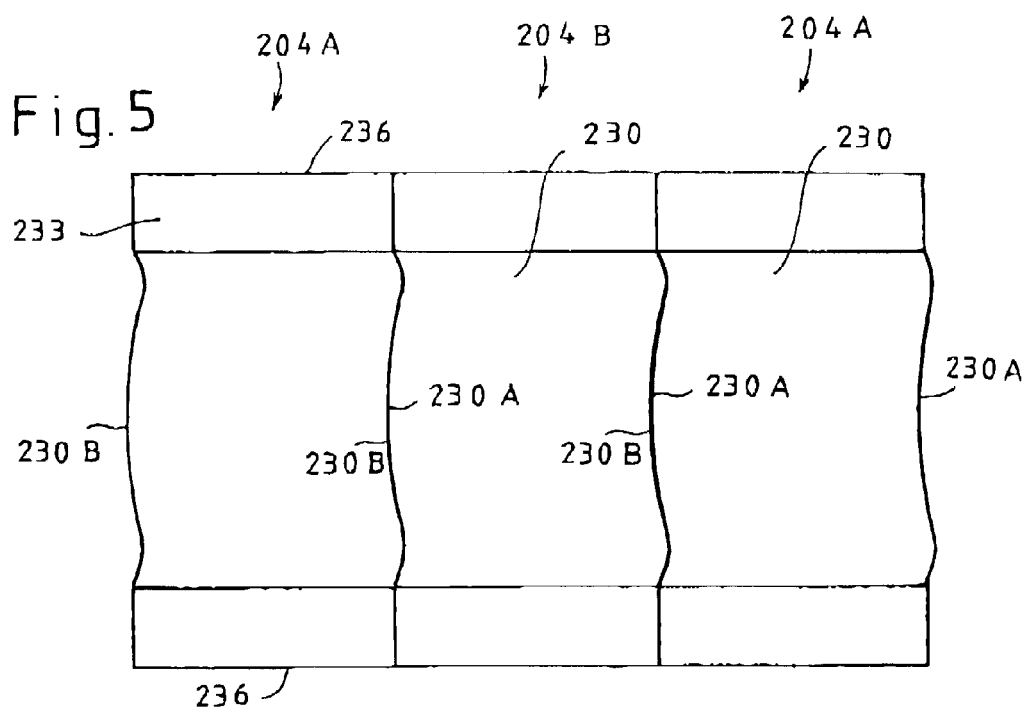
FIG. 5 shows a plan view of the inspection tray.

The inspection opening 6 formed between the metal strips 5A, 5B or 105B respectively offer especial advantages in combination with an inspection tray 204 as the exchangeable tray as it is shown in FIG. 4 and FIG. 5. The inspection tray 204 comprises three identically constructed tray sections 204A, 204B each with a conveyor base section 230 and two here essentially T-shape side profile sections 231 with vertical webs 232 and horizontal webs 233, whereby the side profile section 231 have an identical profile to the side profiles 31, 131 of the other exchangeable trays 4 or 104 respectively. In the inspection tray 204 the outer end surfaces 216 of the outer arm extensions 235 of the horizontal arm 233 of both outer tray sections 204A are welded using long welded seams with the upper side (15, FIG. 2) to the upper flange arm (12, FIG. 2) of the iron U-profiles 10 which extend over the length of the individual tray sections 204A. The center tray section 204B on the other hand is retained by means of detachable tray fastening means, not shown, to the two other tray sections 204A and/or to the iron U-profiles 10 or 110 respectively forming the side walls, so that it can be dismounted in a short time for an inspection of the scraper chain in the bottom run through the opening (6, FIG. 1 ) between the metal strips 5A, 5B. As can be clearly seen from FIG. 5 the conveyor base sections 230 of all the tray sections 204A, 204B are provided with curved edges 230A, 230B preferably produced by flame cutting, whereby the curve profile of the one edge 230A is complimentary to the curve profile of the other edge 230B, so that the scraper circulating in the top run can traverse the abutment positions between the tray sections quietly and without jumping points.

A man skilled in the art will recognise from the foregoing descriptions a series of modifications, which should fall within the area of protection of the attached claims. The wall thicknesses of the iron U-profiles in the two embodiments are only shown for example and the thin walled iron U-profiles could also come into application for the first embodiment and visa versa. The T-shaped side profiles shown in the embodiments could also be L-shaped or angled. In the case of L-shaped or angular side profiles without leg extensions the outer walls of the side profiles of the exchangeable trays could then be welded to the upper flange arms. The horizontal arms of the side profiles could here especially end in a joint with the upper side of the upper flange arms and the welded joints he applied as a detachable means of retaining the exchangeable tray applied in the gap between the iron U-profile and the side profile. Also the conveyor base of all the normal exchangeable trays are preferably provided at the exchangeable tray ends with curved profiles corresponding to that of he inspection trays. In the application of the conveyor pan as a gate conveyor the built on parts such as guide plates connecting brackets, machine tracks and similar can be omitted.

What is claimed is:

1. A conveyor pan for an underground face or gate conveyor with a top run and bottom run for the guidance of the scraper of a scraper chain with a conveyor base separating these, with means for linking the conveyor pans and with two side walls each comprising a rolled iron U-profile having an intermediate arm and two flange arms and which are joined together by at least one welded on plate arranged at about half height and on the vertically extending intermediate arm of the iron U-profiles, in which the iron U-profiles are joined together with their horizontal flange arms facing outwards, that the top run has two separate rolled side profiles, which are welded, to the conveyor base, and that the plate joining the iron U-profiles is supported by means of rails forming side guides for the bottom run against at least a section of a base plate welded to the lower flange arms.

2. A conveyor pan according to claim 1, in which the side profiles are supported by means of an outward facing arm extension of the horizontal arm on the upper flange arm in each case of the iron U-profiles.

3. A conveyor pan according to claim 1, in which the outer end surface of the arm extension of each horizontal arm of the side profiles or the outer walls of the side profiles in each case are welded by means of a single continuous long weld seam to the upper sides of the upper flange arm of the iron U-profiles, whereby for dismounting of the exchangeable tray the welded seam is separated.

4. A conveyor pan according to claim 1, in which the plate joining the iron U-profiles comprises two plate strips arranged separated from each other leaving an opening free between them.

5. A conveyor pan according to claim 4, in which one of the plate strips extends out over one of the conveyor pan ends and over both the ends of the iron U-profiles, the other plate strip conveyor pan is arranged set back from the other conveyor pan end.

6. A conveyor pan according to any claim 1, wherein a single part base plate welded on below the lower flange arms and with edge rails extending out on both sides beyond these, forming the bottom run base onto which two bottom run rails, essentially having two arms, right-angled on the outside and provided on the inside with a curved profile contour matched to the scraper ends are welded on by their lower arms.

7. A conveyor pan according to claim 6, in which the wall thickness of the lower arm of the bottom run rails is at least 30% greater than the wall thickness of the upper arm.

8. A conveyor pan according to claim 6, in which the top surface of each upper arm of the rail and the surrounding edge of each metal strip of the intermediate plate are welded via a single common welded joint to the intermediate arm.

9. A conveyor pan according to claim 1, wherein a bottom run base formed in one part with the bottom run rails, in which bent and vertically extending edge sections form the bottom run rails, whereby the base plate comprises two plate sections extending continuously over the length of the conveyor pan, which are in each case welded to one of the lower flange arms of the iron U-profile.

10. A conveyor pan according to claim 9, in which supporting ribs are welded in between the edge sections of the single part bottom run base and the plate sections.

11. A conveyor pan according to claim 6, in which the outer edge rails of the plate sections or of the base plate, which extend out over the lower flange arms are angled downwards.

12. A conveyor pan according to claim 1, in which the iron U-profile comprises a thin walled formed steel with weight optimising wall thickness.

13. A conveyor pan according to claim 1, in which the means for connecting the conveyor pans comprise forged toggle pockets which are inserted with positive engagement between the mutually facing inner sides of the flange arms and are welded in.

14. A conveyor pan according to claim 13, in which the toggle pockets on one conveyor pan end extend out over the iron U-profile and on the other end of the conveyor pan are welded in to the iron U-profiles.

15. A conveyor pan according to claim 1, in which a connecting bracket for an advancing beam is inserted and welded in at least using its front region between the mutually facing inner sides of the flange arms of the iron U-profile.

16. A conveyor pan according to claim 1, in which for a face conveyor an angled guide plate is welded on as a static loading ramp between the edge rails of the base plate or one of the plate sections and the upper flange arm.

17. A conveyor pan according to claim 1, in which the exchangeable tray is formed as an inspection tray and comprises three identical tray sections each with a conveyor base section and two essentially L-shaped or T-shaped side profile sections, whereby the outer face edges of the arm extensions of the horizontal arms of the side profile sections or the outer walls of the side profiles of the two outer tray sections are welded with the upper side of the upper flange arm using a long welded seam and the centre tray section is retained by means of detachable fastening means to the two other tray sections and/or to the upper flange arms of the iron U-profiles.

18. A conveyor pan according to claim 17, in which the conveyor base section of all the tray sections are provided on the tray side with curved edges produced by flame cutting, whereby the curved profile of the one edge is complimentary to the curved profile of the other edge.

19. A conveyor pan according to claim 1, in which the metal strips forming the intermediate plate and/or the conveyor base are provided on the end sides of the conveyor pan with curved edges produced by flame cutting, whereby the curved profile of the one edge is formed complimentary to the curved profile of the other edge.

* * * * *